United States Patent [19]
Miyahara

[11] Patent Number: 5,699,052
[45] Date of Patent: Dec. 16, 1997

[54] SYSTEM FOR AUTOMATICALLY SELECTING AN AVAILABLE DEVICE IN AN AUDIO/VIDEO SYSTEM

[75] Inventor: Hiroshi Miyahara, Saitama-ken, Japan

[73] Assignee: Pioneer Electronic Corporation, Tokyo, Japan

[21] Appl. No.: 638,869

[22] Filed: Apr. 29, 1996

Related U.S. Application Data

[63] Continuation of Ser. No. 185,248, Jan. 24, 1994, abandoned.

[30] Foreign Application Priority Data

Jan. 29, 1993 [JP] Japan .................. 5-013183

[51] Int. Cl.$^6$ ................................. G05B 19/02
[52] U.S. Cl. .................. 340/825.25; 340/825.24; 345/146; 348/569
[58] Field of Search .............. 340/825.24, 825.25, 340/825.72; 381/77, 81, 123; 345/115, 146; 348/563, 569, 706, 734

[56] References Cited

U.S. PATENT DOCUMENTS

| | | | |
|---|---|---|---|
| 4,712,105 | 12/1987 | Kohler | 340/825.72 |
| 4,989,081 | 1/1991 | Miyagawa et al. | 348/563 |
| 5,097,249 | 3/1992 | Yamamoto | 340/825.72 |
| 5,182,551 | 1/1993 | Goto | 340/825.72 |
| 5,204,662 | 4/1993 | Oda et al. | 340/825.24 |
| 5,223,825 | 6/1993 | Ikezaki | 340/825.24 |
| 5,371,553 | 12/1994 | Kawamura et al. | 348/734 |

FOREIGN PATENT DOCUMENTS

| | | | |
|---|---|---|---|
| 390041 | 10/1990 | European Pat. Off. | 345/146 |
| 149594 | 6/1989 | Japan | 340/825.25 |

Primary Examiner—Michael Horabik
Assistant Examiner—Edward Merz
Attorney, Agent, or Firm—Nikaido, Marmelstein, Murray & Oram LLP

[57] ABSTRACT

A memory is provided for storing purposes utilizing the audio/video system, and kinds of signal media, and a display is provided for displaying the data stored in the memory. In order to select data displayed on the display, a keyboard is provided. In response to a selection by operation of the keyboard, an available device is automatically selected and operated by a control unit.

2 Claims, 10 Drawing Sheets

---

SELECT OBJECT A/V SYSTEM INITIAL MENU

1. LISTENING (RADIO, CASSETTE TAPE, CD)

2. WATCHING (TV, VIDEO CASSETTE, VIDEO DISC)

3. RECORDING (AUDIO)

4. RECORDING (AUDIOVISUAL)

7. UNDO

8. SYSTEM END

| NO. | MODEL NUMBER | A/V | MEDIUM | RECORD/REPRODUCE |
|---|---|---|---|---|
| 1 | VCR-1 | V | T | RW |
| 2 | VCR-2 | V | T | RW |
| 3 | CLD-1 | A·V | D | RO |
| 4 | SEL-1 | A·V | — | — |
| 5 | TV-1 | V | B | RO |

FIG.4 b

| TERMIMAL \ DEVICE | 1 | 2 | 3 | 4 | 5 | 6 |
|---|---|---|---|---|---|---|
| 1 | 4 | 2 | −1 | | | |
| 2 | 4 | 0 | 0 | −1 | | |
| 3 | 4 | 2 | −1 | | | |
| 4 | 1 | 2 | 0 | 0 | 5 | −1 |
| 5 | 0 | −1 | | | | |

FIG.4 c

| TERMIMAL \ DEVICE | 1 | 2 | 3 | 4 | 5 |
|---|---|---|---|---|---|
| 1 | 4 | −1 | | | |
| 2 | 4 | 1 | 3 | −1 | |
| 3 | −1 | | | | |
| 4 | 1 | 2 | 3 | 0 | −1 |
| 5 | 4 | 0 | 0 | −1 | |

```
SELECT OBJECT A/V SYSTEM INITIAL MENU
1. LISTENING (RADIO, CASSETTE TAPE, CD)
2. WATCHING (TV, VIDEO CASSETTE, VIDEO DISC)
3. RECORDING (AUDIO)
4. RECORDING (AUDIOVISUAL)

7. UNDO
8. SYSTEM END
```

FIG.6b

```
WATCHING MENU
SELECT MEDIUM
1. BROADCAST (TV)
2. TAPE (VCR)
3. DISC (VIDEO DISC)

6. RETURN TO INITIAL MENU
7. UNDO
8. SYSTEM END
```

FIG.6c

```
DEVICE SELECT MENU
SELECT DEVICE
1. VCR-1
2. VCR-2

7. RETURN TO PREVIOUS MENU
8. SYSTEM END
```

SYSTEM FOR AUTOMATICALLY SELECTING AN AVAILABLE DEVICE IN AN AUDIO/VIDEO SYSTEM

This application is a continuation of application Ser. No. 08/185,248 filed Jan. 24, 1994, now abandoned.

BACKGROUND OF THE INVENTION

The present invention relates to an audio/video system wherein a plurality of interconnected audio and video devices are provided, and more particularly to a system where available devices in a combined audio/video system can be automatically selected.

The audio/video devices (hereinafter called A/V devices) such as stereo system and videocassette recorder require individual manual operation to operate them. In the case where these devices are connected to form an A/V system, each A/V device, differing in type and manufacturer requires specific and complicated procedures. In the A/V system which comprises various devices, the user selects and operates necessary devices, keeping in mind the types and the number of the devices and how they are connected to one another.

When the number of the A/V devices increases, or sophisticated devices having various functions are included in the A/V system, it becomes difficult for the user to completely recognize all of the functions of the devices and the connections therebetween. Hence, the user cannot quickly select devices which comply with the user's purpose. Namely, the effective operation of the A/V system declines.

SUMMARY OF THE INVENTION

An object of the present invention is to provide an A/V system where available devices in the system which comply with the user's purpose are easily selected.

According to the present invention there is provided a system for automatically selecting an available device in an audio/video system, comprising a memory storing information regarding activities utilizing the audio/video system, and kinds of signal media, a display for displaying characters purposes and signal media representing the stored activities in the memory, a keyboard for selecting an activity and a signal medium displayed on the display, and control means responsive to a selection by operation of the keyboard for operating an available device dependent on the user's selection.

Other objects and features of this invention will become understood from the following description with reference to the accompanying drawings.

DETAILED DESCRIPTION OF THE PREFERRED EMBODIMENTS

Figure 1:
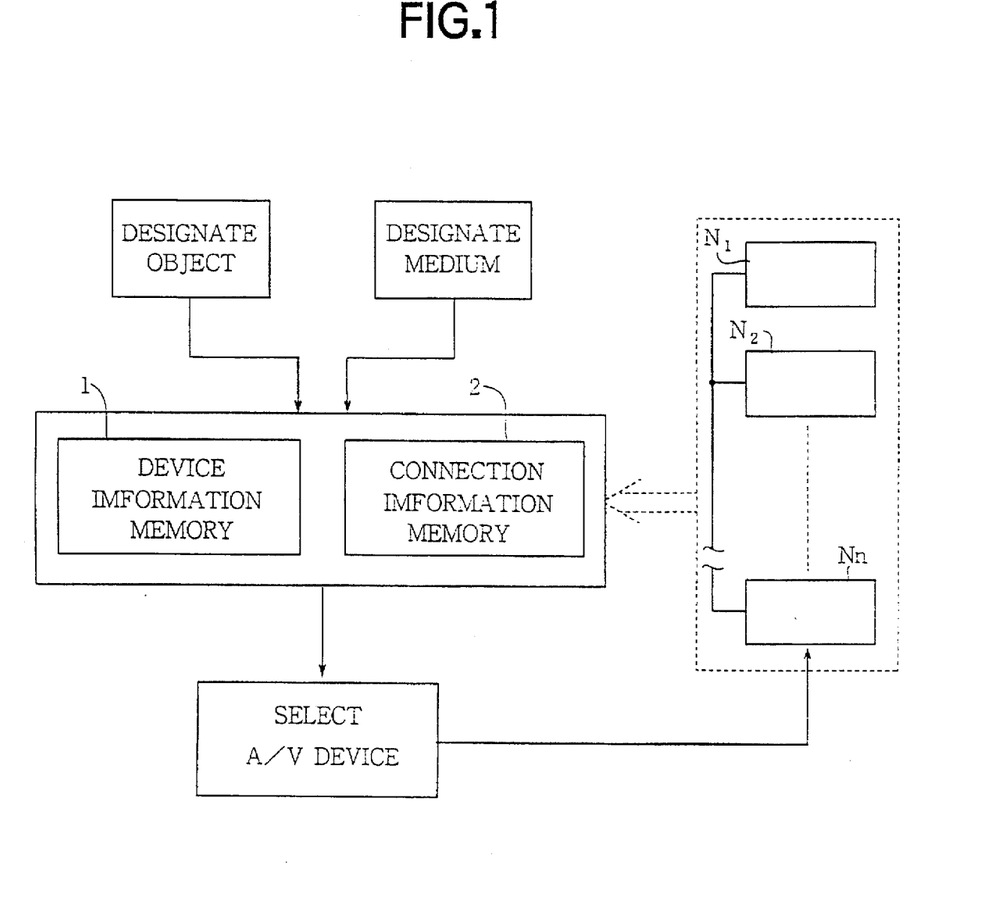
FIG. 1 is a block diagram explaining the principle of the present invention.

The principle of the present invention will be described hereinafter with reference to FIG. 1. The A/V system of the present invention comprises a plurality of A/V devices N1, N2, to Nn which use various signal media such as broadcast signals transmitted through radio waves and cables, magnetic tapes and optical discs. The A/V devices are connected to a control system having a device information memory 1 and a connection information memory 2. The device information memory 1 stores various data on each of the A/V devices, for example, whether the device is an audio device, or an audiovisual device, the type of the medium employed, or whether the device is capable of recording. The connection information memory 2 stores information on connections between each of the A/V devices N1 to Nn. In order to play one of the A/V devices, the user first of all determines the user's purpose utilizing the A/V system, from "listening", "watching" and "recording". The user further designates the preferred signal medium. For example, if "listening" is designated as the object and the "broadcast" is designated as the medium, the radio or television receiver is automatically selected.

The present invention will now be described in detail.

Figure 2:
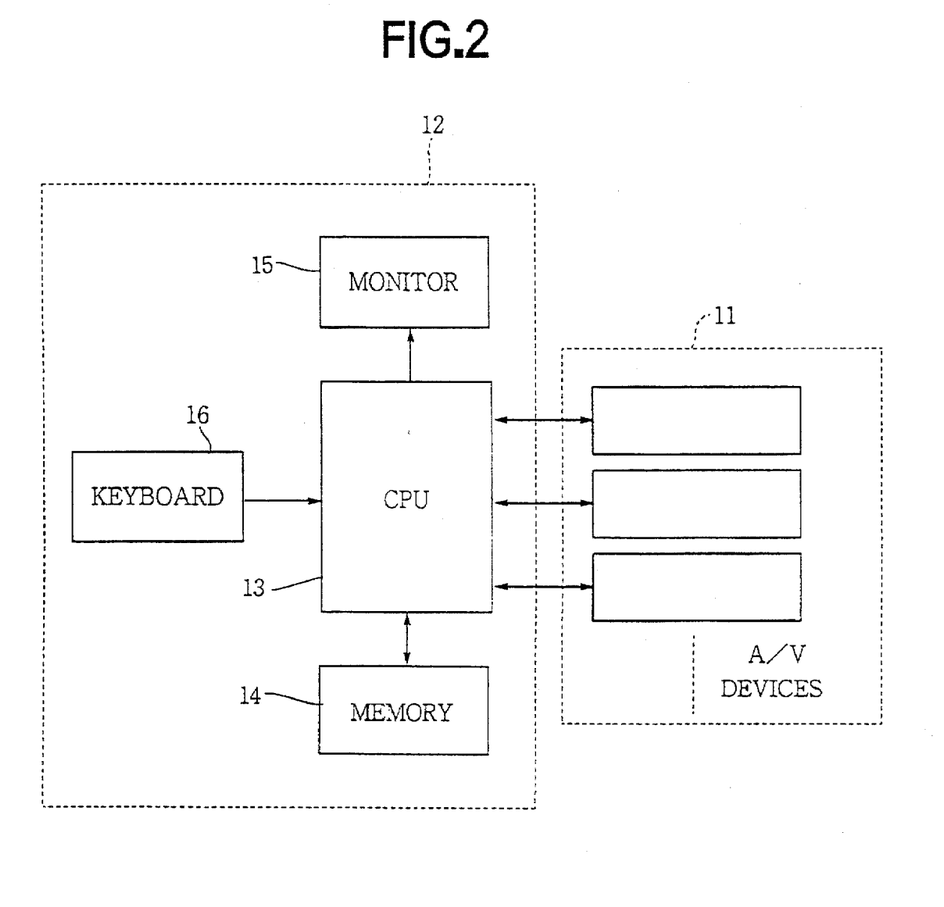
FIG. 2 is a block diagram of an A/V system according to the present invention.
Figure 3:
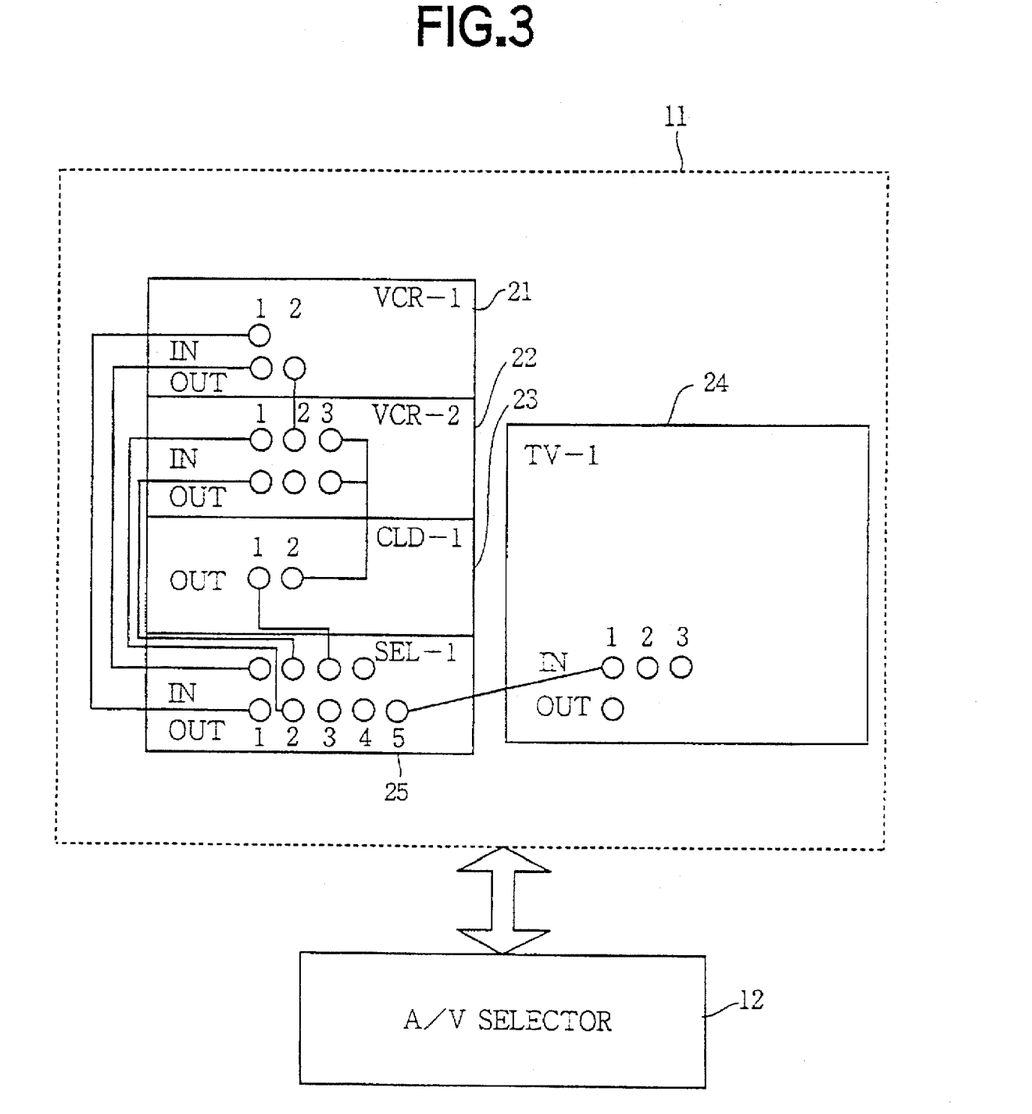
FIG. 3 is an illustration showing an example of A/V devices provided in the system of the present invention, and the connections therebetween.

Referring to FIG. 2, the A/V system according to the present invention comprises a group of A/V devices 11 and an A/V selector 12 which is, for example, a personal computer having an interface connected to the A/V devices 11. In an embodiment shown in FIG. 3, the A/V devices 11 comprises two videocassette recorders (VCRs) 21 and 22, audio and video disc player 23, television 24 and an A/V signal selector 25.

Referring back to FIG. 2, the A/V selector 12 has an information input keyboard 16 connected to a CPU 13 for controlling the entire system. A memory 14 is provided for storing various information. The CPU 13 is connected to each of the A/V devices 21 to 25. Each of the A/V devices 21 to 25 has a command receiving section and an operational state transmitting section thereby transferring information to and from the CPU 13.

Figure 4:
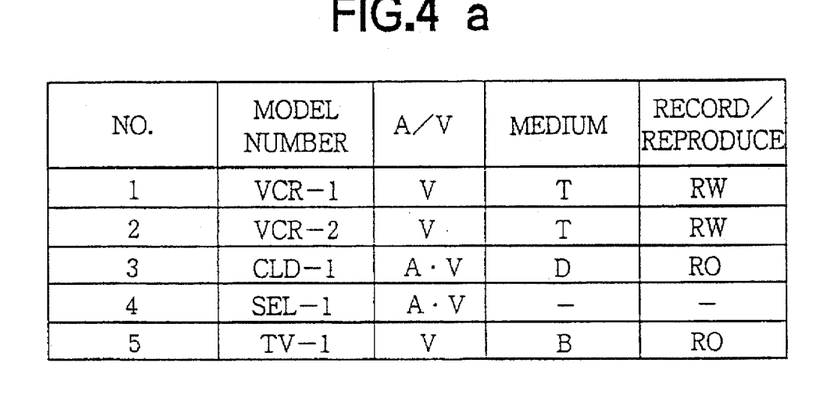
FIG. 4a is a table showing information on the A/V devices which is stored in a memory provided in the system of the present invention.
FIGS. 4b and 4c are tables showing information on connection of the output and input terminals of the A/V devices, respectively.

FIG. 4a shows information on the A/V devices 21 to 25 which are stored in the memory 14. The information includes the types of the A/V devices, that is whether each device is an audio device (A) or an audiovisual device (V), model numbers of the devices, the signal f medium employed in each device such as tape (T), optical disc (D) or broadcast (B), and the function of the device, whether it is capable of both recording the reproducing data (RW) or merely capable of reproducing data (RO).

The memory 14 further stores information on connections between the devices as shown in the tables in FIGS. 4b and 4c wherein the connections of the input terminals and output terminals are respectively shown. The reference "0" in the tables indicates that the terminal is unused, and "−1" indicates that there are no further terminals.

Figure 5:
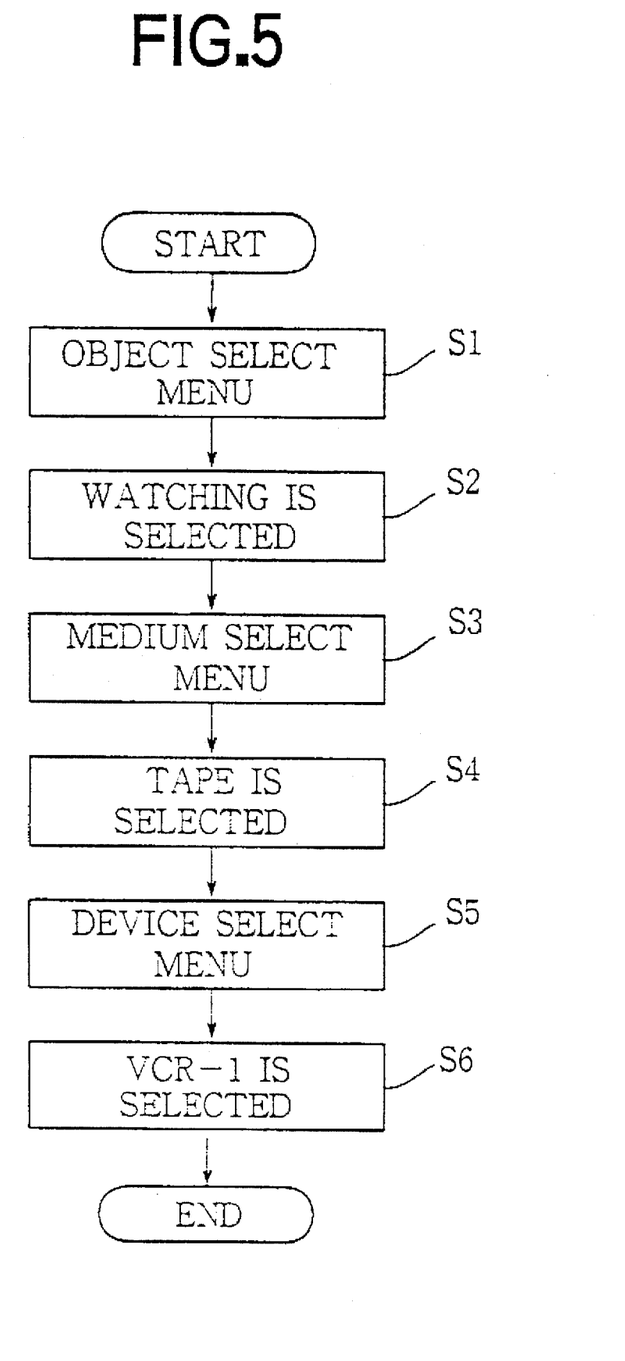
FIG. 5 is a flowchart briefly explaining an example of the operation of the A/V system.
Figure 6A:
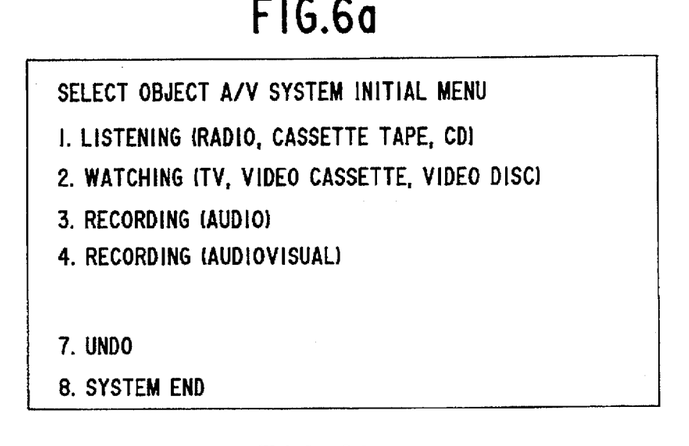
FIG. 6a, 6b and 6c show menus which are shown on the display of a monitor provided in the A/V system during the operation thereof.

Referring to FIG. 5 showing an example of the operation for selecting an A/V device, at a step S1, an object select menu shown in FIG. 6a is indicated on a screen of the monitor 15. In the menu are listed various objects attainable by the A/V devices 21 to 25. Such objects, namely user's purpose utilizing the A/V system, are listening, watching, and recording audio signals or audiovisual signals. The user operates the keyboard 16 to set a desired purpose.

Figure 6B:
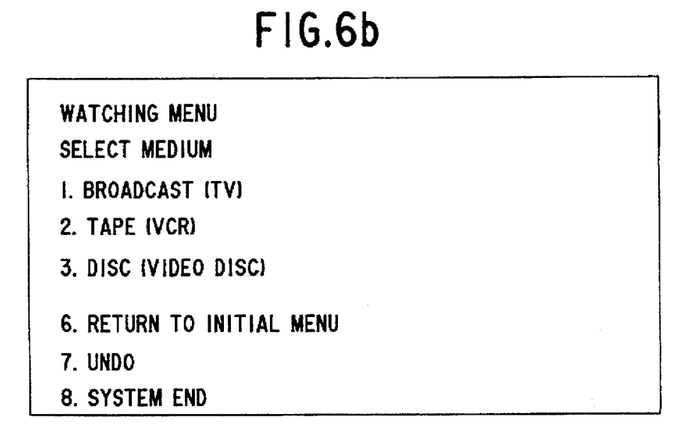
Figure 6C:
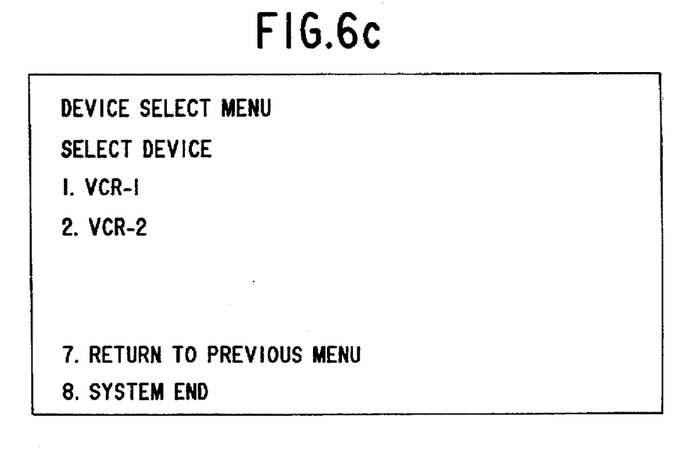

Supposing that, in the presently described example, watching is set at a step S2, the CPU 13 of the A/V selector 12 derives information from the memory 14 and displays a signal medium select menu on the monitor 15 at a step S3 in accordance with the information. Referring to FIG. 6b, the options in the medium select menus are media, such as broadcast, tape, and optical disc, which are capable of satisfying the demand of the user, in the present case, watching. If the medium tape is selected from the options at a step S4 the CPU 13 derives information from the memory 14 to indicate a device select menu shown in FIG. 6c. The menu lists model numbers of all of the A/V devices, in this case VCR-1 and VCR-2. There are two VCRs, the user must select a device of his choice at a step S6. Thus the appropriate A/V device is easily selected.

The operation of the present invention will be described more in detail with reference to FIGS. 7 to 9.

At the start of the operation, the CPU 13 is operated to show the object select menu on the monitor 15 at a step S10. At a step S11, the user operates the keyboard 16 to select the object for operating the A/V system. When the selected object is either listening or watching, the program goes to a step S12 where the reproduction routine is executed. On the other hand, if the selected program is recording, a recording routine is executed at a step S13.

Figure 7:
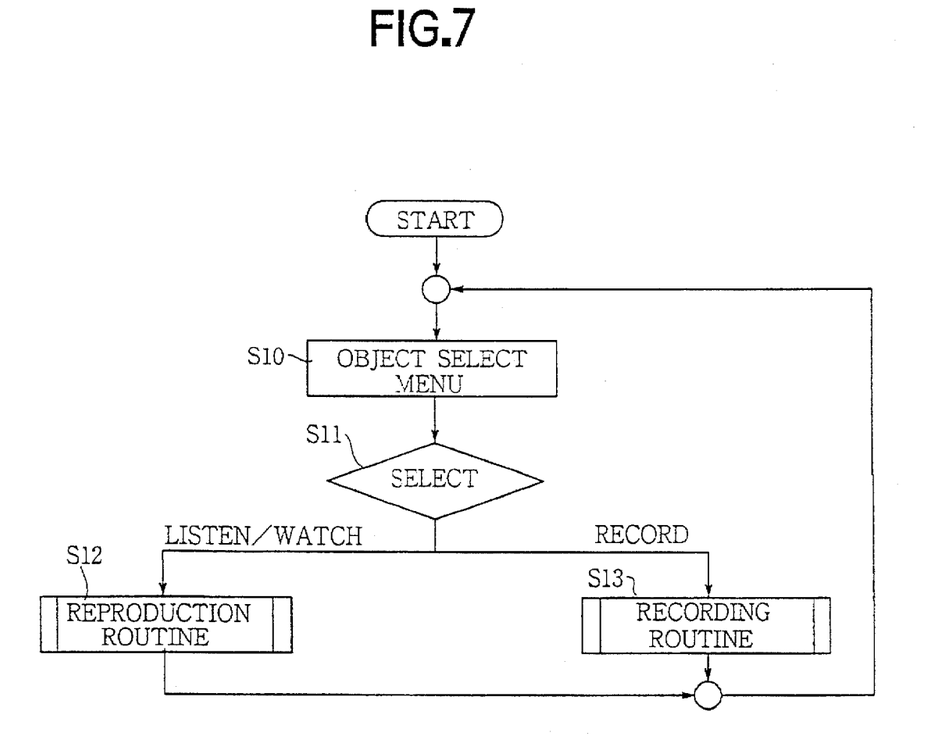
FIG. 7 is flowchart explaining in detail a main routine of the present invention.
Figure 8:
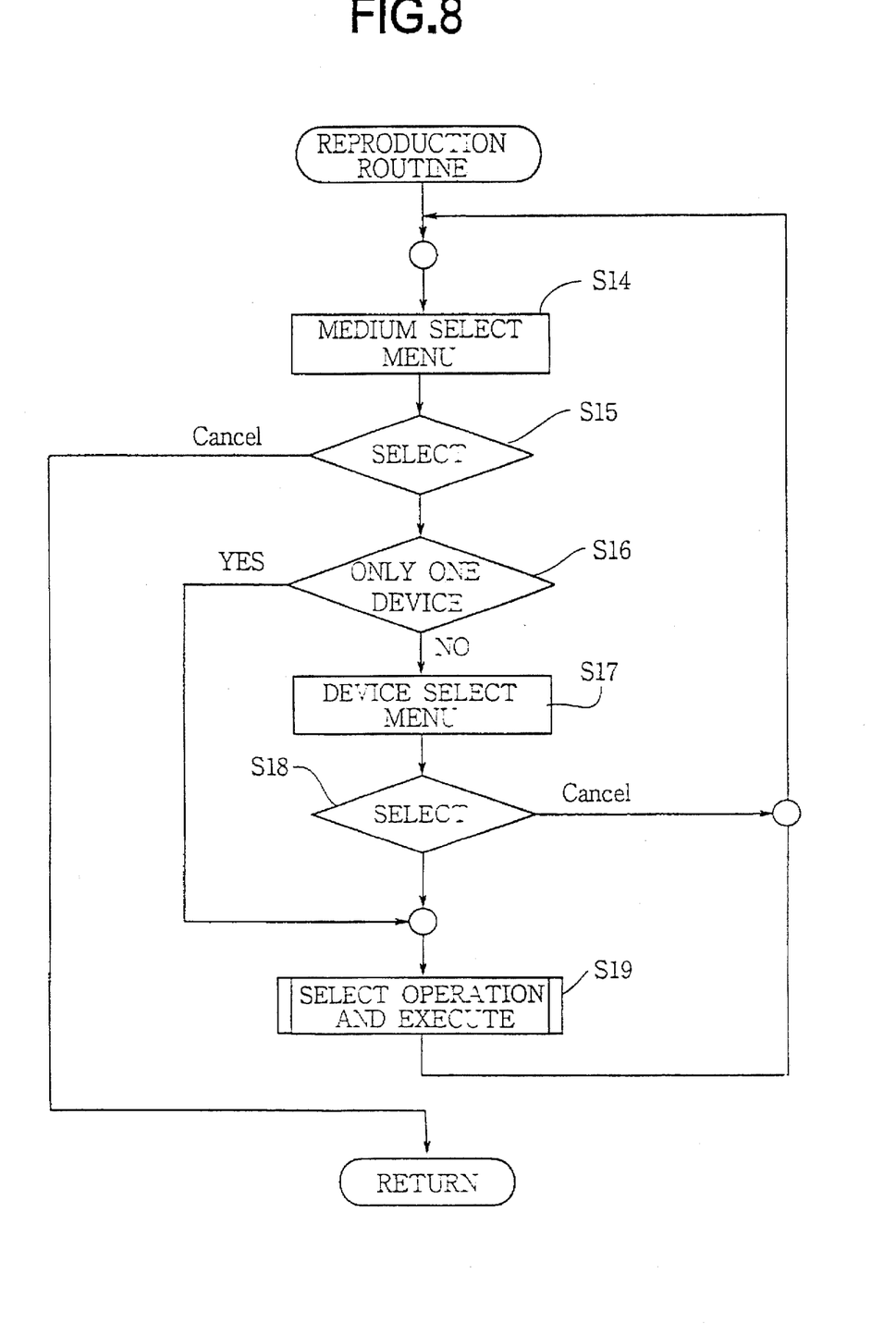
FIG. 8 is a flowchart of a reproduction routine according to the present invention.

Referring to FIG. 8, in the reproduction routine, the signal medium select menu indicating signal media which corresponds to the object designated at the step S11 of FIG. 7 is shown on the monitor 15. When a medium is selected at a step S15, the CPU 13 retrieves the model number of the appropriate devices from the memory 14 in accordance with the information on the devices and their connections. When it is determined at a step S16 that there is only one device which complies with the set object and the medium, the program goes to a step S19 where the operation of the device is selected and executed in accordance with the command of the CPU 13.

When there are two or more available devices, the device select menu is indicated at a step S17. The user then chooses a device from the options at a step S18, and thereafter the device is operated at the step 19.

Figure 9:
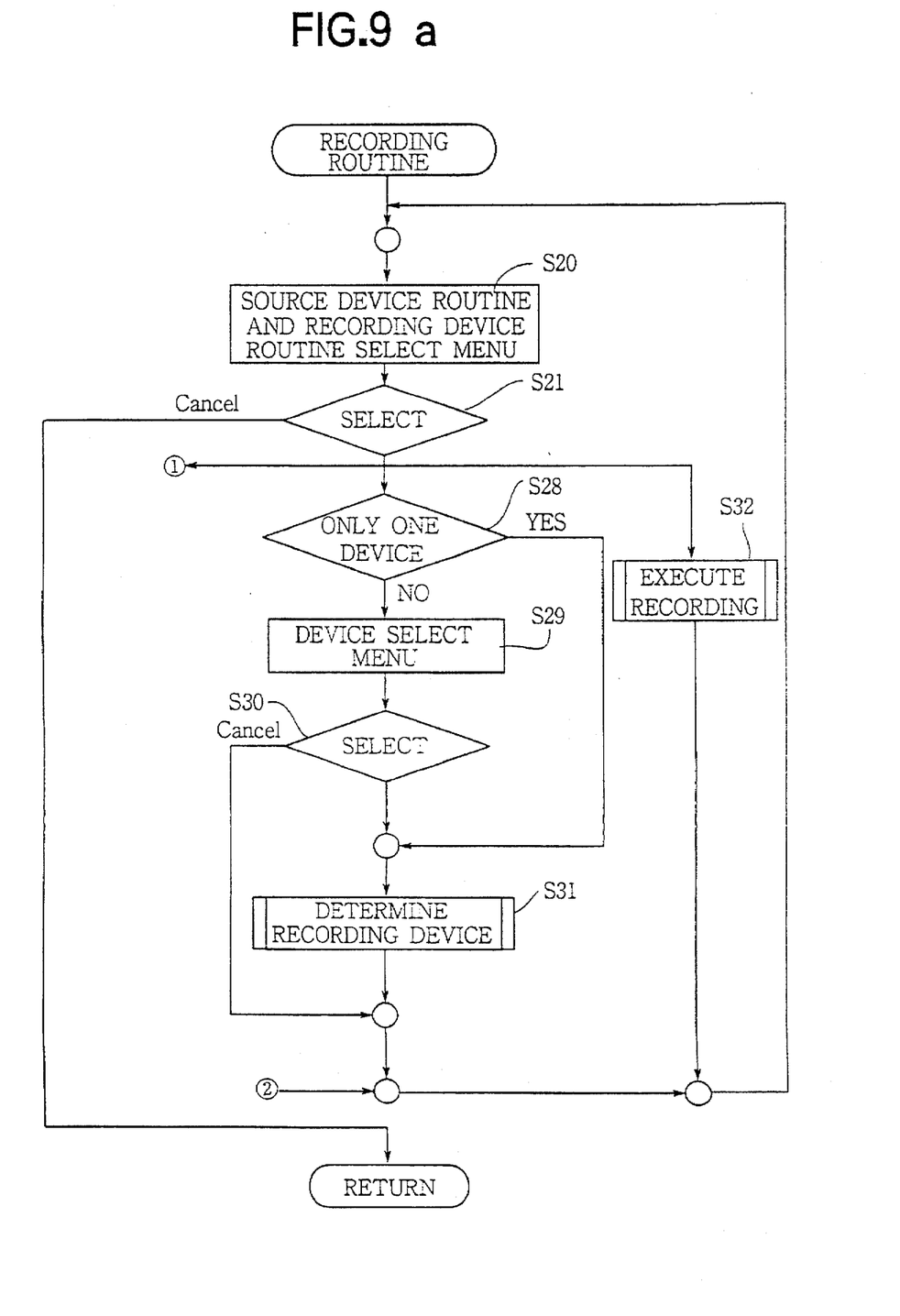
FIGS. 9a and 9b show a flowchart of a recording routine.

When recording is selected at the step S11 in FIG. 7, the recording routine shown in FIG. 9 is executed. At a step S20, a source device routine and recording device routine select menu is shown so that the user may determine the source device routine first. If the user determines the source device routine at a step S21, the medium select menu is shown at a step S22 so that the user further determines the medium at a step S23. The model numbers of the source devices which satisfies the user's intention are retrieved by looking up the memory 14. If only one device is usable, the program proceeds from a step S24 to a step S27 where the source device is determined. When there are more than one devices usable as the source device, the device select menu is shown at a step S25, thereby requiring the user to select from the options at a step S26. The device is thus determined at a step S27.

Thereafter, the program returns to the step S20. The user, this time, operates the keyboard 16 at the step S21 for determining the recording device which records information reproduced by the device determined at the step S27. Namely, the CPU 13 looks up the memory 14 to determine which of the devices capable of recording are connected to the selected reproducing device. When there is only one appropriate device, the program jumps from a step S28 to a step S31 where the recording device is determined. If there are more than one device capable of recording, the monitor 15 shows the device select menu at a step S29. The user chooses a device from the options of the menu at a step S30 so that the device is determined and operated at the step S31 by operating the keyboard 16.

Thereafter, the program returns to the step S20. Since the devices are now determined, the execution of the recording is selected at the step S21, thereby automatically starting the recording operation at a step S32.

The present invention may be adapted to a centralized controlled A/V system including other devices such as a multifunctional video telephone, in case of which the options in the object select menu are accordingly increased. The A/V system may further comprise a communication system adapted to transmit digital information and to display the information. An audio device having a body sonic function which applies physical vibrations to the listener, and other devices with various functions may be further connected, whereby the options in the object select menu and medium select menu are further specified in detail.

The A/V system of the present invention has a memory storing information on the devices provided in the A/V system, namely, objects such as listening, watching the recording, media such as broadcast tape, optical disc, used in each device, and connections between the devices. Hence it is possible for the user to systematically select the A/V devices which complies with the user's demand. The A/V devices are centralized controlled, so that the user need not to learn the operating procedure for each device which differs depending on the manufacturer and the type thereof. Since the selecting procedure is carried out with the intention of the user as the main concern, and not with each specific device, the operation of the A/V system is facilitated.

While the presently preferred embodiments of the present invention has been shown and described, it is to be understood that these disclosures are for the purpose of illustration and that various changes and modifications may be made without departing from the scope of the invention as set forth in the appended claims.

What is claimed is:

1. A system for automatically selecting an available device in an audio/video system, comprising:

a display;

a memory storing device codes for individually distinguishing a plurality of audio/video media including a plurality of audio devices and a plurality of audiovisual devices included in the audio/video system, first information on kinds of available media among the plurality of audio/video media, and second information on conditions of interconnection between devices;

means for operating the display for displaying common symbols to said plurality of audio devices and said plurality of audiovisual devices representing common senses with which a user can sense audio and visual reproductions, the senses including a sense of hearing and sense of sight, and signalling said first and second information corresponding to data regarding the plurality of audio/video media, said data being stored in the memory, said symbols and said first and second information being displayed in order to indicate to the user to select one of the senses and one of the plurality of audio/video media;

a keyboard for selecting an activity of an intended sense and a medium displayed on the display; and control means responsive to a selection by operation of the keyboard for determining an available device from device codes dependent on the user's selection and an interconnection of devices relative to the selection.

2. The system according to claim 1 further comprising means for manually selecting one of devices in the audio/video system.

* * * * *